United States Patent [19]

Rota

[11] Patent Number: 4,485,731
[45] Date of Patent: Dec. 4, 1984

[54] APPARATUS FOR THE CONTINUOUS MANUFACTURE OF BUTTERMILK CURD

[76] Inventor: Guido Rota, c/o Ing. Misitano A.G., Via Padova, 217 Milano, Italy

[21] Appl. No.: 298,759

[22] Filed: Sep. 2, 1981

[30] Foreign Application Priority Data

Jun. 11, 1981 [IT] Italy ............................... 22264 A/81

[51] Int. Cl.³ ...................... A23C 19/024; A01J 25/00
[52] U.S. Cl. ........................................ 99/453; 99/459; 99/534; 426/41; 426/583
[58] Field of Search ................. 99/452, 453, 455, 456, 99/458, 459, 460–462, 465, 466, 467, 470, 473, 474, 483, 516, 495, 496; 426/582, 583, 495, 491, 490, 36, 41, 657, 231

[56] References Cited

U.S. PATENT DOCUMENTS 2,209,694  7/1940  Harford ............................... 426/583

FOREIGN PATENT DOCUMENTS 2053650  2/1981  United Kingdom .................. 99/453

*Primary Examiner*—Timothy F. Simone
*Attorney, Agent, or Firm*—Joseph W. Molasky & Assoc

[57] ABSTRACT

Buttermilk curd is continuously manufactured by heating whey in a tank to a temperature below that at which curd will form, preferably 75° C., and pumping the heated whey to a treatment channel through a heating chamber in proximity thereto. The whey is further heated in the heating chamber to a temperature suitable for curd formation, preferably 85° C., and is sprayed in the treatment chamber with a coagulant liquid, the resulting curd being swept along the channel by an endless blade conveyor to an endless band conveyor which conveys the curd to a discharge station. The apparatus disclosed includes two tanks to which whey is alternately supplied and in which the whey is heated to ensure a continuous supply of heated whey to the heating chamber. The whey from the heating chamber enters the treatment channel through a perforated partition in proximity to which are located spray nozzles for the coagulant liquid.

1 Claim, 3 Drawing Figures

APPARATUS FOR THE CONTINUOUS MANUFACTURE OF BUTTERMILK CURD

BACKGROUND OF THE INVENTION

This invention relates to improvements in an apparatus for the continuous manufacture of buttermilk by treating, with a coagulant liquid, whey to which other ingredients such as, for example, milk, cream and the like may be added.

It is known that oxidation of buttermilk curd gives rise to a relatively inferior product and can cause obstructions in the apparatus giving rise to a disruption of the continuity of the process.

SUMMARY OF THE INVENTION

It is an object of the present invention to provide an improved apparatus for the continuous production of buttermilk curd in which the untimely formation of the curd and its potential exposure to oxidation in the apparatus is materially reduced whereby the disadvantage referred to is materially reduced if not entirely obviated.

According to the invention there is provided apparatus for the continuous manufacture of buttermilk curd from whey comprising a tank, means for supplying whey to the tank, means for heating the whey in the tank to a first predetermined temperature, a substantially horizontal treatment channel, means for supplying heated whey from said tank to said channel, said supply means including a heating chamber in proximity to said channel, means for heating whey in said heating chamber to a second predetermined temperature greater than said first predetermined temperature, spray nozzles operable to spray a coagulant liquid into said channel to form curd, means for sweeping said channel to carry the formed curd away from said nozzles, an endless band conveyor aligned with said sweeping means and operable to receive the swept curd and convey it to a discharge station.

One embodiment of the invention will now be described by way of example.

DETAILED DESCRIPTION OF THE PREFERRED EMBODIMENT

Figure 1:
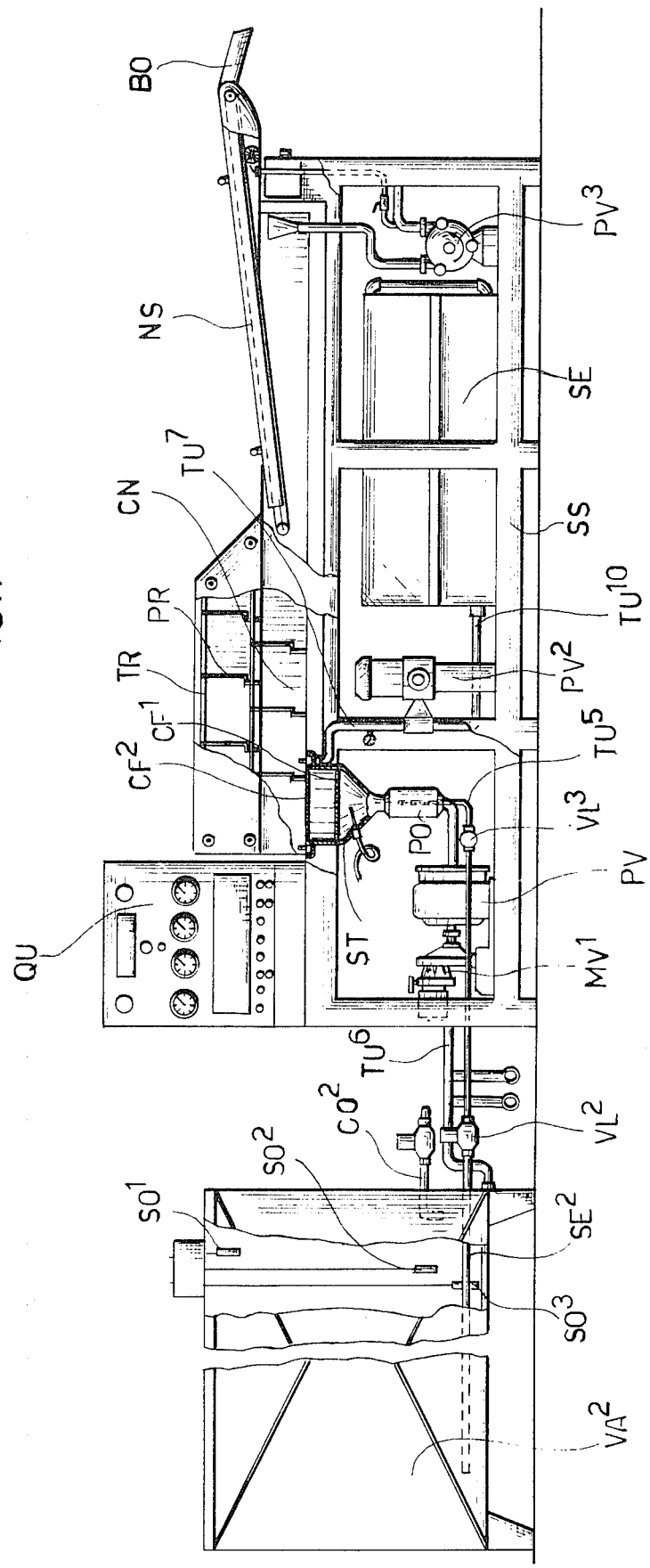
FIG. 1 is an elevational view with parts broken away of an apparatus according to the invention for the manufacture of buttermilk curd.
Figure 2:
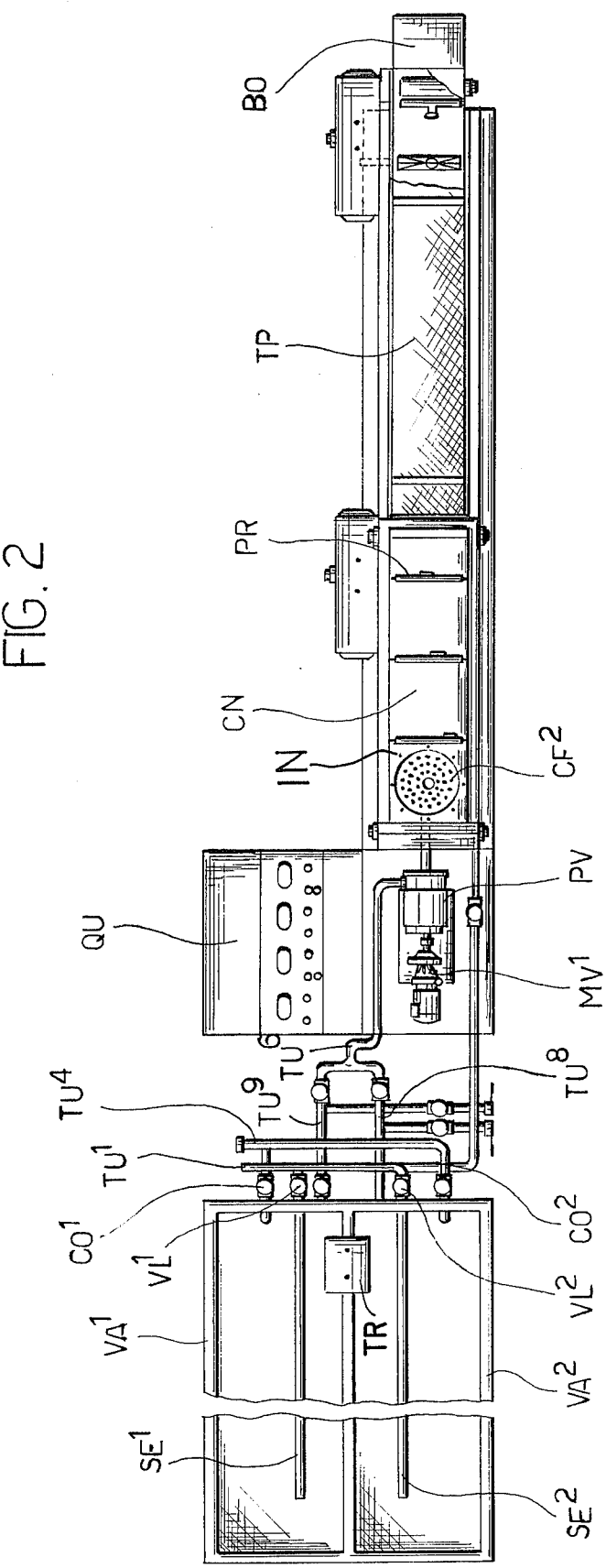
FIG. 2 is a top plan view of the apparatus shown in FIG. 1.
Figure 3:
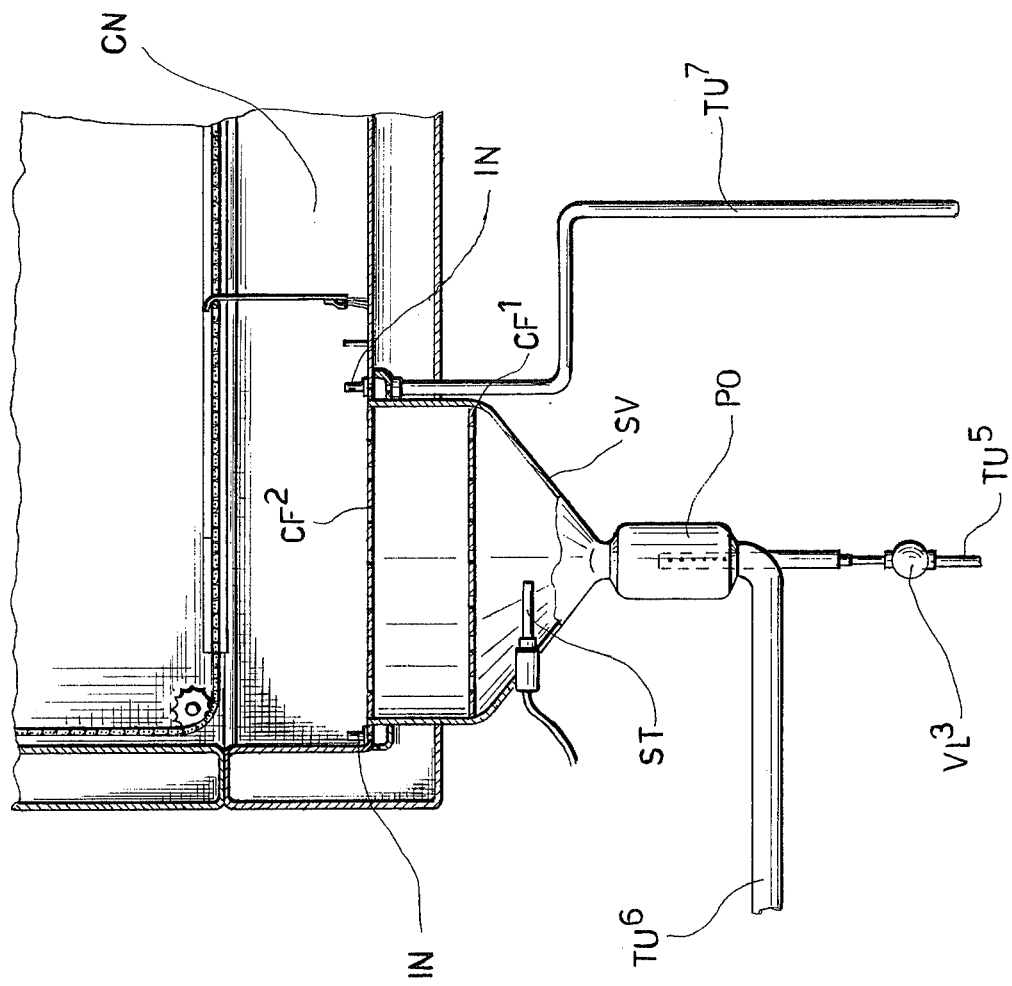
FIG. 3 is an enlarged part-elevational, part-sectional view of a part of the apparatus shown in FIGS. 1 and 2.

Twin elongate storage tanks $VA^1$ and $VA^2$ of prismatic shape and separated by a common partition are provided with respective heating coils $SE^1$ and $SE^2$ connected to a common steam pipe $TU^1$ through control valves $VL^1$ and $VL^2$. Inlet pipes $CO^1$ and $CO^2$ respectively open to the tanks $VA^1$ and $VA^2$ for the supply of whey thereto from a common supply pipe $TU^4$.

The valves $VL^1$ and $VL^2$ are controlled by a temperature response means TR via a signal from a control board QU which senses the temperature of the whey in the tanks by temperature sensors (not shown) disposed in the tanks $VA^1$ and $VA^2$ and which provides a visual display of such temperature. The temperature of the whey in the tanks $VA^1$ and $VA^2$ is therefore effectively thermostatically controlled.

Outlet pipes $TU^8$ and $TU^9$ communicate respectively with the tanks $VA^2$ and $VA^1$ and, through outlet valves with a common outlet pipe $TU^6$ which communicates with a volumetric pump PV the speed of which is controlled by a variator $MV^1$. The outlet valves in the pipes $TU^8$ and $TU^9$ are controlled level sensors $SO^1$, $SO^2$ and $SO^3$ which are disposed in each tank.

The sensor $SO^1$ senses the predetermined maximum level of whey in a tank, the sensor $SO^3$ senses the predetermined minimum level of whey in a tank and the sensor $SO^2$ senses an intermediate level approaching the minimum level. The level sensors thus control the valves to ensure that no whey can be supplied to a tank which is at the maximum level and no whey is pumped from a tank which is at the minimum level.

The outlet of the pump PV communicates through a pipe $TU^6$ with the lower end of a cylindrical heating chamber PO to which steam is supplied through a duct $TU^5$ under the control of a valve $VL^3$. The upper end of the chamber PO opens to a funnel shaped or frusto conical chamber SV which opens upwardly and merges into a cylindrical decantation chamber defined between two perforated partitions $CF^1$ and $CF^2$ and which communicate with a heat insulated substantially horizontal treatment channel CN where the formation of curd takes place. A temperature sensor ST is disposed in the chamber SV and is operable to control the valve $VL^3$ thermostatically to control the temperature in the heating chamber PO.

A number of spray nozzles IN open through the bottom of the treatment channel in proximity to and about the partition $CF^2$ to inject a solution of coagulent liquid for the whey into the treatment channel CN, this liquid being supplied through pipe $TU^7$ by a metering pump $PV^2$ connected through a supply pipe $TU^{10}$ to a reservoir SE carried in a metal frame SS.

An endless blade conveyor TR is mounted in the treatment channel CN and has a plurality of spaced articulated blades PR which depend from the chains of the conveyor and which in the lower run successively sweep the floor of the treatment channel to convey formed curd away from the location of the nozzles to the lower end of an upwardly inclined endless band conveyor aligned with the blade conveyor TR and arranged to deliver the curd to a discharge station BO from which it may be manually collected. The floor of the endless band conveyor is designed to allow the curd to drain as it is being conveyed.

Exhausted material is removed from the treatment channel at the end remote from the spray nozzles IN by a drain pump $PV^3$ which feeds this material to a stock tank for eventual use as a by-product for feeding animals.

In the operation of the apparatus described, whey is supplied alternately from the common supply pipe $TU^4$ to the tanks $VA^1$ and $VA^2$ through the appropriate one of the inlet pipes $CO^1$ and $CO^2$ so that one tank is always full and ready for use when the other is empty. The level of whey in each tank is sensed by the level sensors $SO^1$, $SO^2$ and $SO^3$ which control valves in the inlet pipes $CO^1$ and $CO^2$ for this purpose and also control the valves in the outlet pipes $TU^8$ and $TU^9$. The whey in the tanks is heated to a temperature of about 60° C. by the steam coils $SE^1$ and $SE^2$ at which stage ingredients such as, for example, milk, cream and the like can be added to the whey if desired. The whey is then further heated by the steam coils to a temperature of less than 80° C. and preferably not more than 75° C. A higher temperature is not desired as this would lead to the untimely or premature formation of curd which is not desired for reasons previously explained.

The heated whey is pumped from whichever tank is operative at that time by the pump PV to the cylindrical chamber in which it is further heated to a temperature of above 80° C. and preferably about 85° C. by the steam supplied through the duct $TU^5$, this temperature being controlled by the valve $VL^3$ in response to the temperature sensed by the sensor ST. The heated whey then passes through the perforated partition $CF^1$ to the decantation chamber and through the perforated partition $CF^2$ into the treatment channel CN where the coagulant liquid from the spray nozzles IN impinges upon it and the reaction takes place at the optimum temperature of 85° C. The curd formed by the reaction is swept along by the blades PR of the conveyor TR to the endless band conveyor NS which conveys it to the discharge station BO for collection whilst allowing it to drain. Spent material is removed from the treatment channel CN by the pump $PV^3$ and fed to a stock tank for eventual use as a by-product for feeding animals.

It will be appreciated that although two tanks $VA^1$ and $VA^2$ have been described, any number may be provided to ensure a constant supply of whey heated to the appropriate temperature from one tank while the other or others are being replenished and heated. It will also be appreciated that the whey in these tanks is heated to a temperature approaching but below that at which curd forms and that the final temperature boost to the temperature required for curd formation is provided in the chamber PO in proximity to the treatment channel CN and immediately before the whey is exposed to the coagulant liquid.

It will further be appreciated that if no ingredients are to be added to the whey in the tanks $VA^1$ and $VA^2$ the whey may be heated to the 75° C. temperature referred to without the preliminary heating to 60° C. which is preferred where ingredients are to be added.

What is claimed is:

1. Apparatus for the continuous manufacture of buttermilk curd from whey comprising a tank, means for supplying whey to said tank, means for heating said whey in said tank to a first predetermined temperature of less than 80° C., a substantially horizontal treatment channel, means for supplying heated whey from said tank to said channel, said supply means including a heating chamber in proximity to said channel, means for heating whey in said heating chamber to a second predetermined temperature of above 80° C., spray nozzles operable to spray a coagulant liquid into said channel to form curd, means for sweeping said channel to carry the formed curd away from said nozzles, an endless band conveyor aligned with said sweeping means and operable to receive the swept curd and convey it to a discharge station, temperature response means in said tank operatively associated with the heating means for the whey in the tank to define said first predetermined temperature, said heating chamber being of substantially cylindrical shape and opening successively through a frusto-conical chamber and a decantation chamber to said treatment channel, said decantation chamber being defined between a first lower perforated partition confining said frusto-conical chamber and a second upper perforated partition confining said treatment channel and said nozzles opening to said channel in proximity to said second perforated partition.

* * * * *